United States Patent
Gulotta

(10) Patent No.: US 10,870,462 B2
(45) Date of Patent: Dec. 22, 2020

(54) BICYCLE HANDLEBAR CUSHIONING SYSTEM

(71) Applicant: Robert K. Gulotta, Eau Claire, WI (US)

(72) Inventor: Robert K. Gulotta, Eau Claire, WI (US)

(*) Notice: Subject to any disclaimer, the term of this patent is extended or adjusted under 35 U.S.C. 154(b) by 0 days.

(21) Appl. No.: 16/601,989

(22) Filed: Oct. 15, 2019

(65) Prior Publication Data

US 2020/0039602 A1 Feb. 6, 2020

Related U.S. Application Data

(63) Continuation of application No. 15/622,264, filed on Jun. 14, 2017, now Pat. No. 10,543,881.

(51) Int. Cl.
*B62K 21/26* (2006.01)

(52) U.S. Cl.
CPC .................... *B62K 21/26* (2013.01)

(58) Field of Classification Search
CPC ........................ B62K 21/26; Y10T 74/20828
See application file for complete search history.

(56) References Cited

U.S. PATENT DOCUMENTS

| | | | | |
|---|---|---|---|---|
| 2,425,245 A * | 8/1947 | Johnson | ............... | B25D 17/043 16/431 |
| 3,713,350 A | 1/1973 | Brilando | | |
| 4,380,093 A * | 4/1983 | Morgan | ................. | B62K 21/26 16/421 |
| 5,193,246 A | 3/1993 | Huang | | |
| 5,207,713 A | 5/1993 | Park | | |
| 5,209,508 A | 5/1993 | Lennon | | |
| 5,253,435 A | 10/1993 | Auger | | |
| 5,348,360 A * | 9/1994 | Mencarelli | ............... | B25G 1/01 16/421 |
| 6,821,218 B2 | 11/2004 | Byrne | | |
| 8,881,347 B2 | 11/2014 | Feinstein | | |
| 2004/0007086 A1 | 1/2004 | Cummings | | |
| 2005/0043110 A1 | 2/2005 | Lindsey | | |
| 2007/0137410 A1* | 6/2007 | Chang | .................... | B62K 21/26 74/551.9 |
| 2016/0339983 A1* | 11/2016 | Liao | ....................... | B62K 21/26 |

* cited by examiner

*Primary Examiner* — Patrick Cicchino

(57) ABSTRACT

A bicycle handlebar cushioning system includes a mount that is contoured such that the mount is complementary in shape to a set of bicycle handlebars. The mount has a perimeter wall having a first end and a second end and is elongated from the first end to the second end. The perimeter wall has an elongated break therein extending between and through the first and second ends. The break receives the handlebars and the mount is resiliently bendable such that the mount snaps onto and frictionally engages the bicycle handlebars. The perimeter wall has an outer surface with an elongated trough therein. At least one cushioning member is provided and includes an insert that is removably positioned in the trough. The insert comprises a resiliently compressible material. A securing member releasably secures a bottom side of the insert to a bottom wall of the trough.

12 Claims, 6 Drawing Sheets

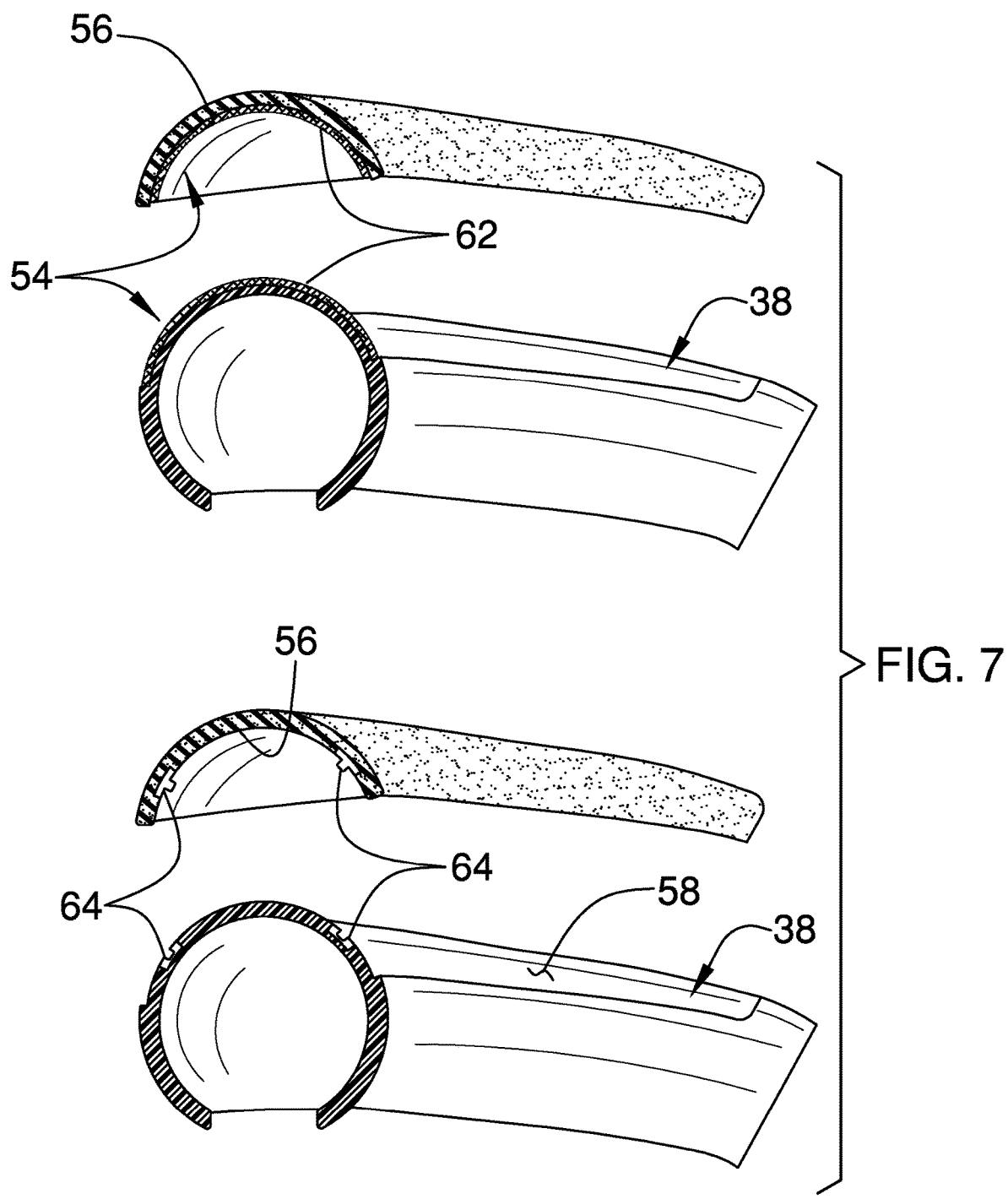

US 10,870,462 B2

1

BICYCLE HANDLEBAR CUSHIONING SYSTEM

CROSS-REFERENCE TO RELATED APPLICATIONS

I hereby claim the benefit under 35 U.S.C., Section 120 of U.S. application Ser. No. 15/622,264 filed Jun. 14, 2017, of which this application is a continuation in part.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bicycle handlebar cushioning device and more particularly pertains to a new bicycle handlebar cushioning device that allows for interchangeable cushioning members to suit the specific needs of a bicyclist for a given set of circumstances.

(2) Description of Related Art Including Information Disclosed Under 37 CFR 1.97 and 1.98

The prior art relates to bicycle handlebar cushioning devices to facilitate the comfort of the hands, and more specifically the palm areas, of a bicyclist when the bicyclist is gripping handlebars.

BRIEF SUMMARY OF THE INVENTION

An embodiment of the disclosure meets the needs presented above by generally comprising a mount that is contoured such that the mount is complementary in shape to a set of bicycle handlebars. The mount has a perimeter wall having a first end and a second end and is elongated from the first end to the second end. The perimeter wall has an elongated break therein extending between and through the first and second ends. The break receives the handlebars and the mount is resiliently bendable such that the mount snaps onto and frictionally engages the bicycle handlebars. The perimeter wall has an outer surface with an elongated trough therein. At least one cushioning member is provided and includes an insert that is removably positioned in the trough.

2

The insert comprises a resiliently compressible material. A securing member releasably secures a bottom side of the insert to a bottom wall of the trough.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 7 is are side views of embodiments of securing members of the disclosure.

DETAILED DESCRIPTION OF THE INVENTION

Figure 1:
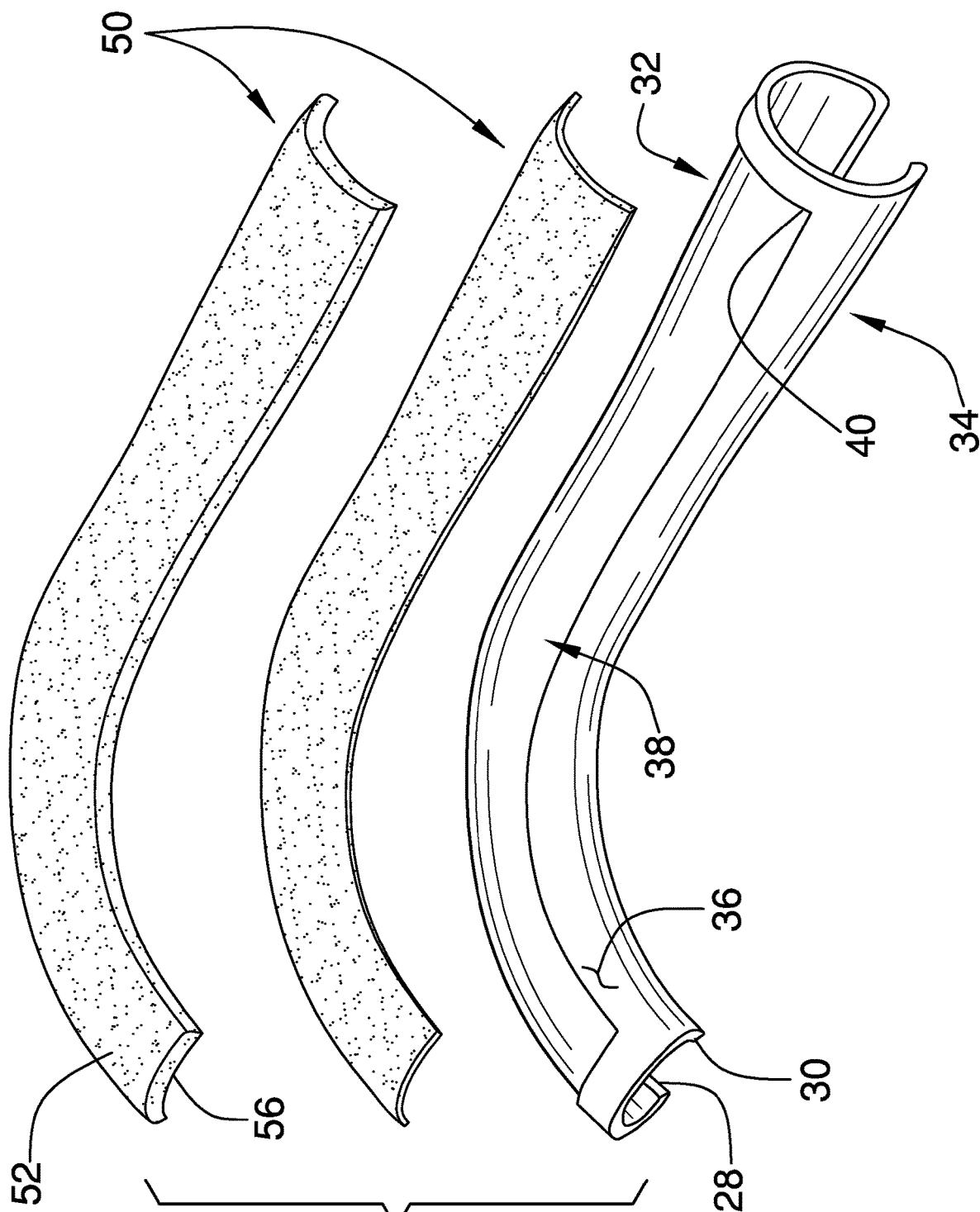
FIG. 1 is a top isometric view of a bicycle handlebar cushioning system according to an embodiment of the disclosure including a plurality of cushioning members.
Figure 2:
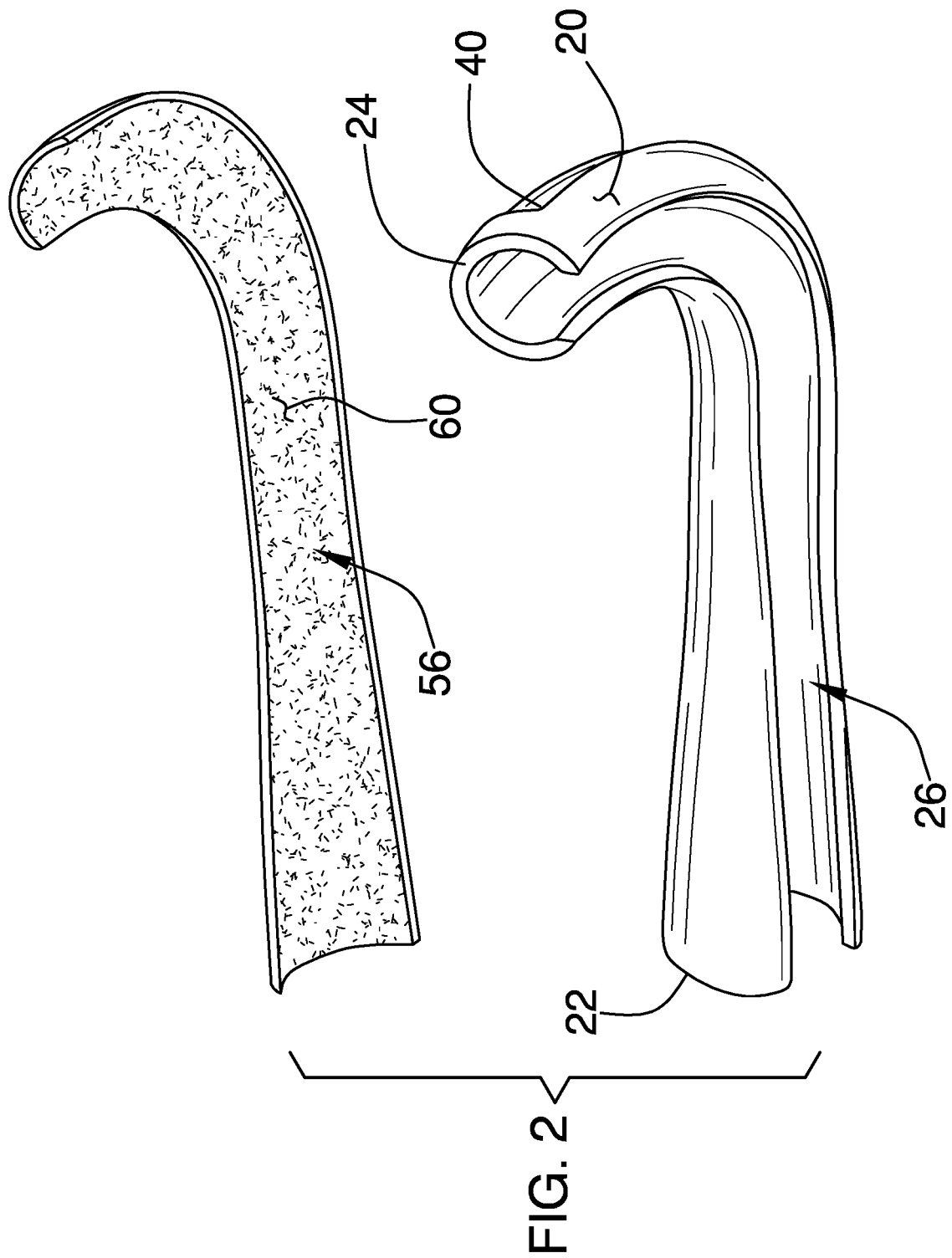
FIG. 2 is a bottom isometric view of an embodiment of the disclosure.
Figure 3:
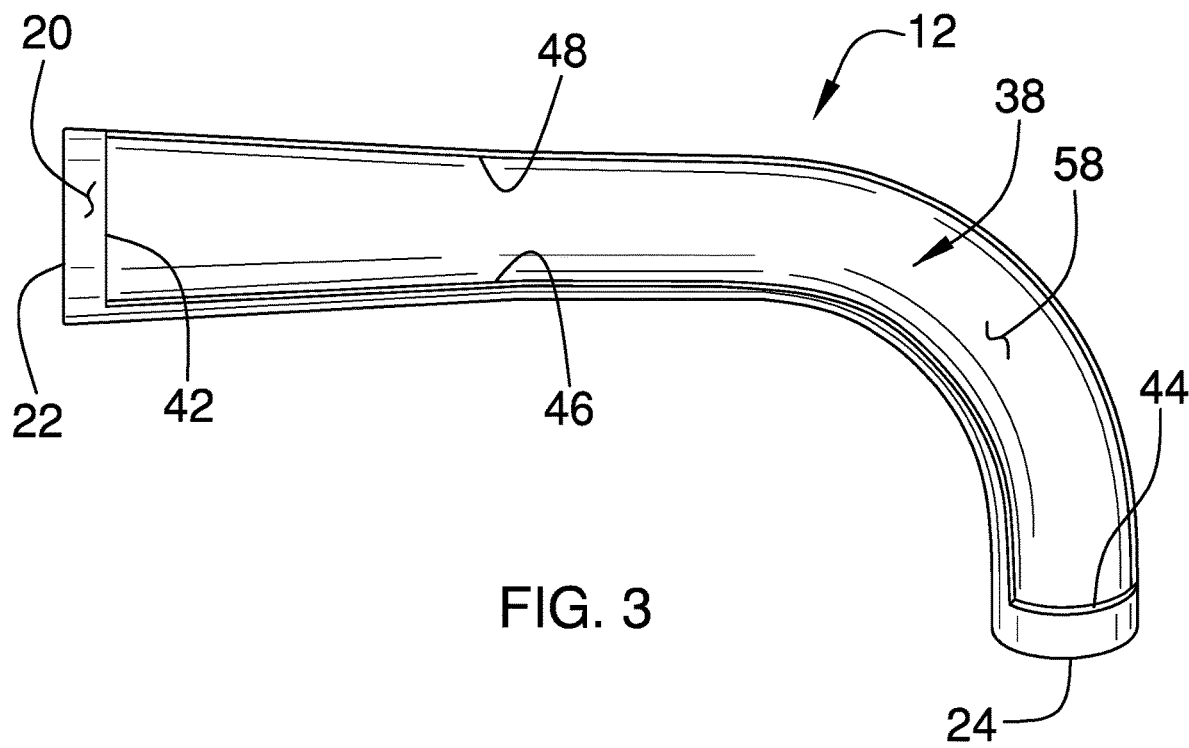
FIG. 3 is a top view of an embodiment of the disclosure.
Figure 4:
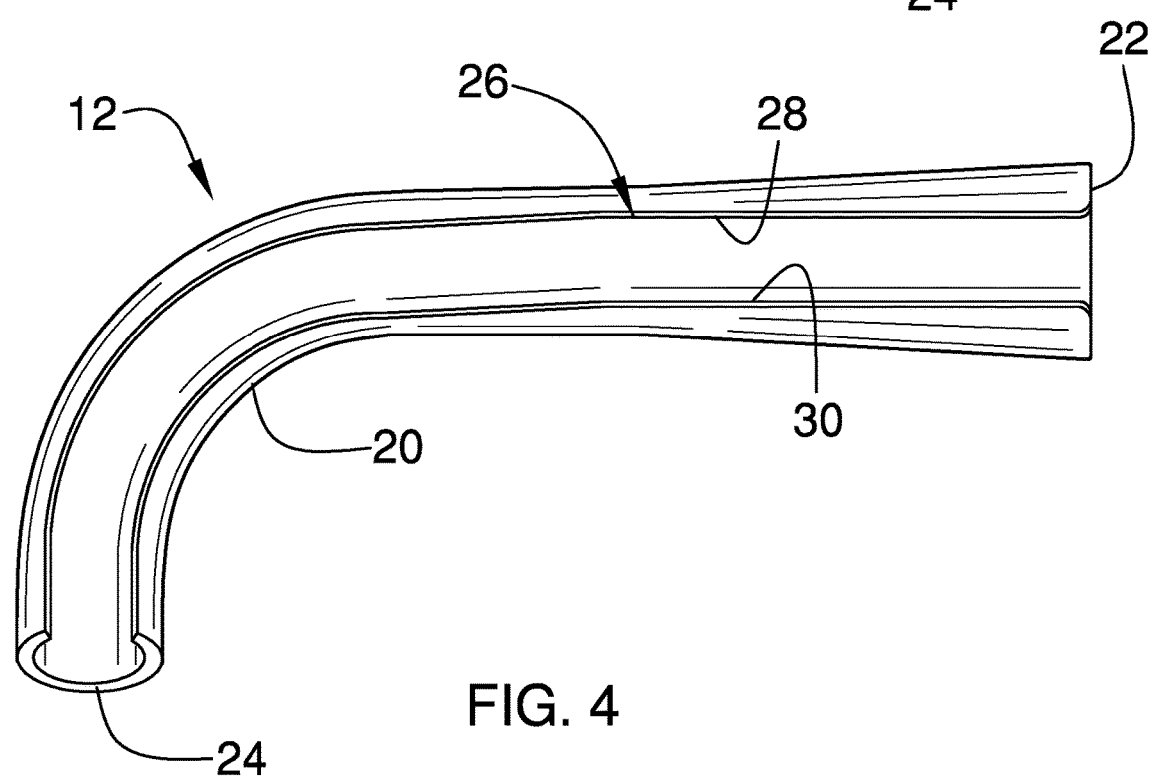
FIG. 4 is a bottom view of an embodiment of the disclosure.
Figure 5:
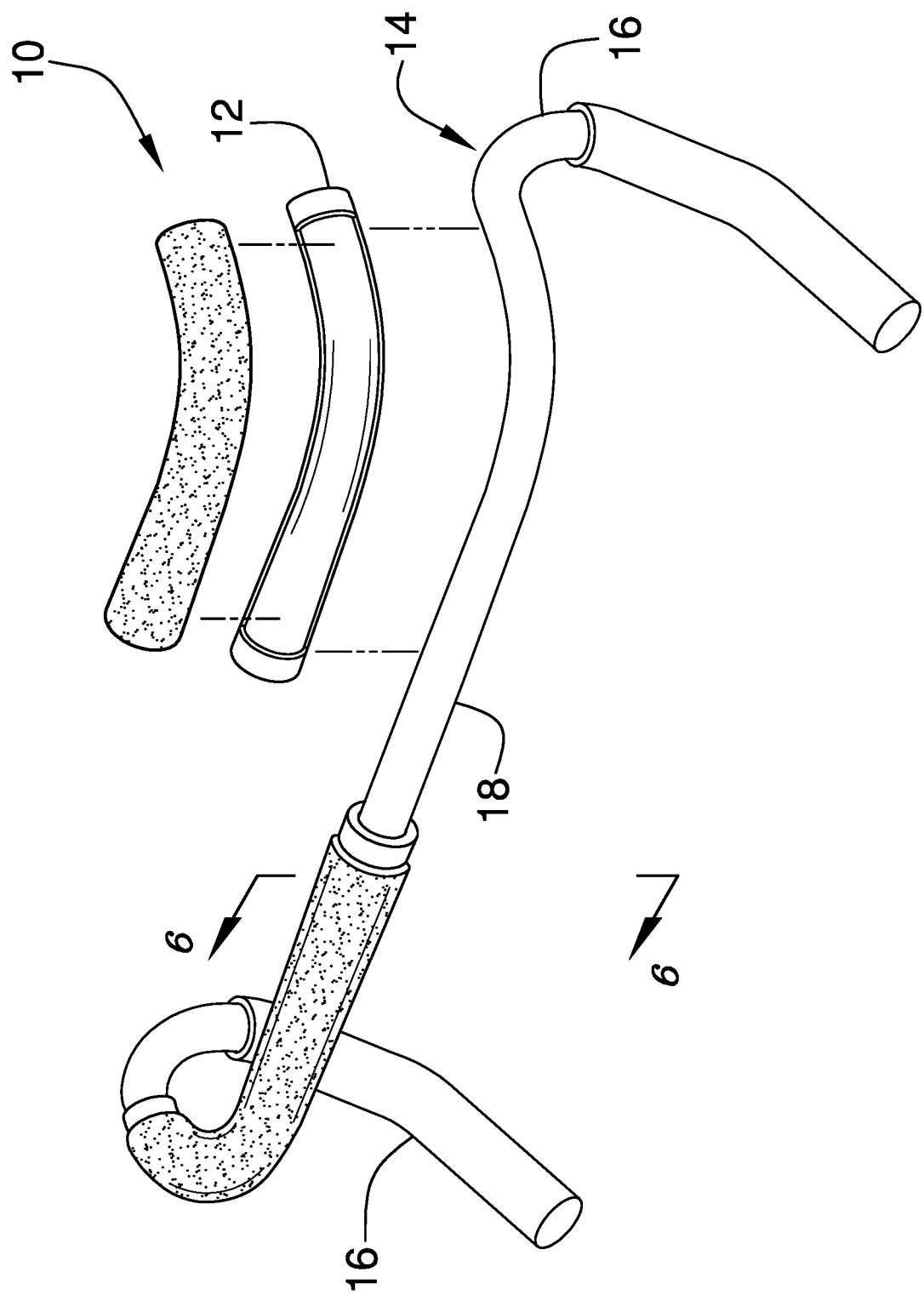
FIG. 5 is a top, isometric in-use view of an embodiment of the disclosure.
Figure 6:
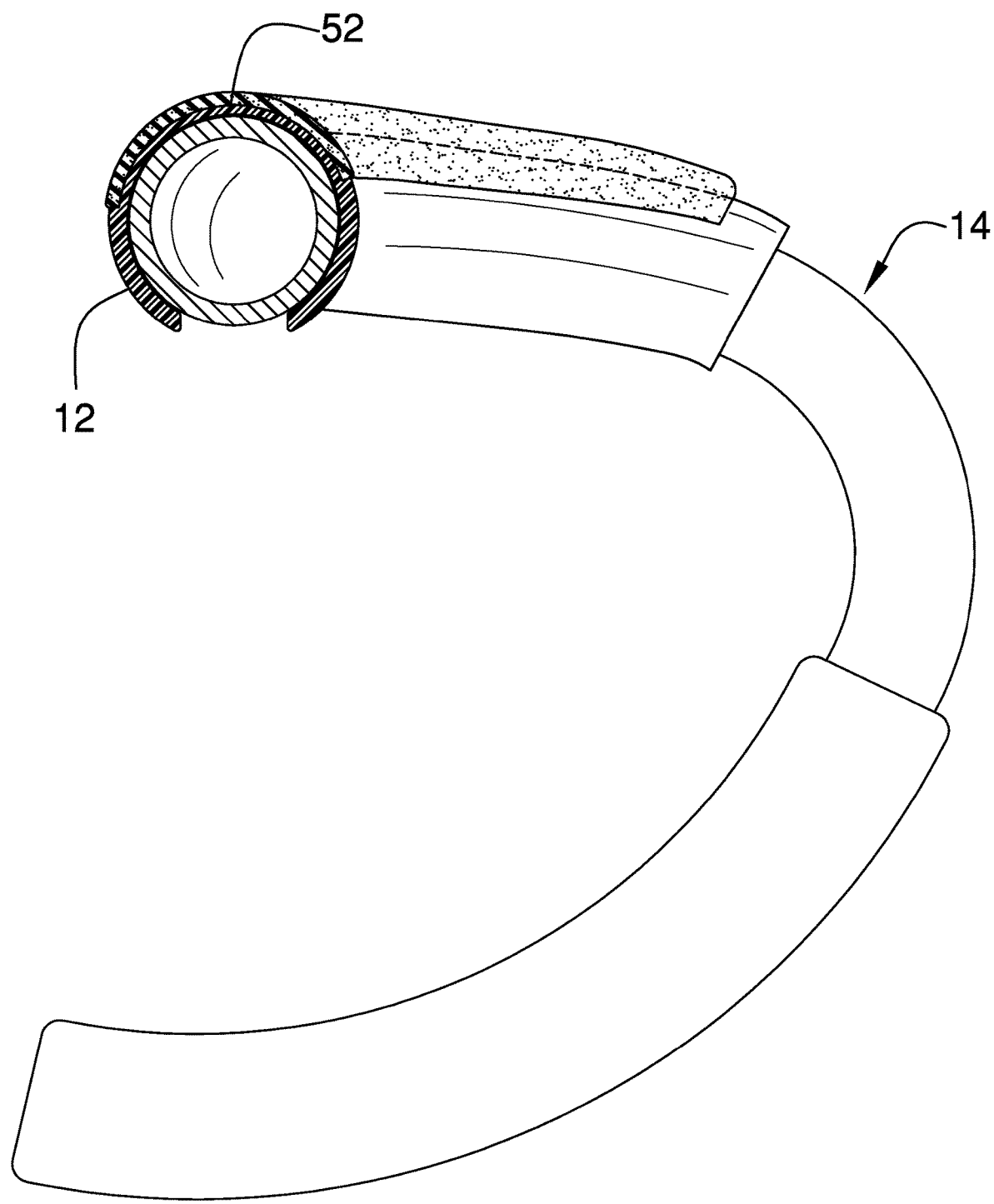
FIG. 6 is a cross-sectional view of an embodiment of the disclosure taken along line 6-6 of FIG. 5.

With reference now to the drawings, and in particular to FIGS. 1 through 7 thereof, a new bicycle handlebar cushioning device embodying the principles and concepts of an embodiment of the disclosure and generally designated by the reference numeral 10 will be described.

As best illustrated in FIGS. 1 through 7, the bicycle handlebar cushioning system 10 generally comprises a mount 12 configured to releasably engage and be retained on a set of bicycle handlebars 14. The bicycle handlebars 14 are conventional and may in particular comprise what are known as drop bars 16 used on road bikes such as those found in long distance and race bicycling. These types of bicycle handlebars 14 generally include a stem, not shown, attached to a crosspiece 18 having a pair of opposed ends. To each of the opposed ends is attached a drop, or drop bars 16, which extends forward from the crosspiece 18 and then arcs downwardly and back to form a laterally angled U-shaped structure. The junctures of the crosspiece 18 and the drops 16 are also formed by arcs.

The mount 12 is contoured such that the mount 12 is configured to be complementary in shape to the bicycle handlebars 14. While the handlebars 14 shown in the Figures have a tubular or cylindrical cross-section, it should be understood that handlebars 14 may be provided with a relatively planar upper surface. Regardless, the mount 12 will be contoured as needed to fit the requisite handlebars 14. The mount 12 has a perimeter wall 20 with a first end 22 and a second end 24 and is elongated from the first end 22 to the second end 24. The perimeter wall 20 has an elongated break 26 therein extending between and through the first 22 and second 24 ends. A first free edge 28 of the perimeter wall 20 and a second free edge 30 of the perimeter wall are defined on opposite sides of the break 26. The break 26 is configured to receive the handlebars 14. The mount 12 is comprised of a resiliently bendable material but is sufficiently rigid such that the mount 12 snaps onto and is configured to frictionally engage the bicycle handlebars 14. Materials typically used may include, for example, plastics and carbon composites. The perimeter wall 20 has an upper portion 32 and a lower portion 34 positioned opposite of each other wherein the break 26 is positioned in the lower portion 34.

The perimeter wall 20 has an outer surface 36 having an elongated trough 38 therein. The trough 38 extends from a position adjacent to the first end 22 to a position adjacent to the second end 24. The trough 38 is bounded by a peripheral edge 40. The peripheral edge 40 includes a first edge 42 positioned adjacent to the first end 22, a second edge 44 positioned adjacent to the second end 24. A forward edge 46 and a rearward edge 48 of the trough each extends between the first 42 and second 44 edges. The forward 46 and rearward 48 edges are each spaced from the break 26 a distance greater than 0.25 inches and more typically a distance greater than 0.50 inches. Furthermore, the forward 46 and rearward 48 edges are spaced from each other a distance equal to at least 0.75 inches.

A plurality of cushioning members 50 is provided to allow an end user to select which cushioning member 50 will be utilized. Each of the cushioning members 50 comprises an insert 52 that is removably positioning in the trough 38. The insert 52 has a size and shape corresponding to the trough 38 such that the insert 52 entirely fills the trough 38. The insert 52 has a greater depth than a depth of the trough 38 such that the insert 52 extends upwardly away from the outer surface 36 of the perimeter wall 20. Typically the trough 38 will have a depth of less than 0.35 inches. The insert 52 comprises a resiliently compressible material. The resiliently compressible material will most often include a foam material which may further comprise gel foams. Gel foams may be preferred for their ability to retain their shape for short periods after deformation and therefore are more readily apt to contour to a person's palm. A securing member 54 releasably secures a bottom side 56 of the insert 52 to a bottom wall 58 of the trough 38. The securing member 54 may comprise any conventional securing member 58 that readily allows removal of the insert 52 from the trough 38. Some suitable securing members may include adhesives 60, hook and loop fasteners 62 and snaps 64. Should snaps 64 be utilized having first and second mating members, typically the first mating member will be embedded into the bottom wall 58 of the trough 38 while the second mating member will be attached to the bottom side 56 of the insert 52.

As indicated above, there will typically be multiple cushioning members 50 provided to the end user wherein at least two of the cushioning members 50 have a different depth with respect to each other. That is, the cushioning members 50 may be comprised of a same material, but have different depths and therefore provide different cushioning conditions. Alternatively, or in addition, at least two of the cushioning members 50 may comprise a different material, particularly as to its exterior coating, with respect to each other. By altering materials, the user may select not only differing cushioning characteristics but differing tactile experiences. Moreover, the materials may be altered as needed to depending on the ability of the material to transfer heat or absorb perspiration.

In use, a bicyclist selects a mount 12 that matches the shape and contour of their handlebars 14. It should be understood that the bicyclist will use at least two mounts 12 positioned on opposite ends of the crosspiece 18. The mount 12 will extend to the drop bars 16. Additional mounts 12 may be positioned on the drops bars 16 themselves and such an embodiment is fully contemplated by the instant disclosure. Either before or after the user snaps the mount 12 onto the handlebars 14, a cushioning member 50 is selected for particular conditions anticipated by the bicyclist. Thus, the cushioning member 50 may be selected for the amount of cushioning offered, its tactile attributes as well as, optionally, its absorptive properties. The cushioning member 50 may be quickly removed and replaced when worn out or if the bicyclist determines that a cushioning member 50 with different characteristics is warranted. Essentially, the cushioning member 50 provides comfort for the hands of the bicyclist when gripping the handlebars for long durations of time is required. The trough 38 ensures stability of the cushioning member 50 relative to the mount 12 without requiring permanent fixing of the cushioning member 50 to the mount 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cushioning system for a positioning on bicycle handlebars, said system comprising:
   a mount being contoured such that said mount is configured to be complementary in shape to a set of bicycle handlebars, said mount having a perimeter wall, said perimeter wall having a first end and a second end and being elongated from said first end to said second end, said perimeter wall having an elongated break therein extending between and through said first and second ends, wherein said break is configured to receive the handlebars, said mount being resiliently bendable such that said mount snaps onto and is configured to frictionally engage the bicycle handlebars;
   said perimeter wall having an outer surface having an elongated trough therein;
   at least one cushioning member comprising:
      an insert being removably positioning in said trough, said insert comprising a resiliently compressible material, wherein said insert has a greater depth than a depth of said trough such that said insert extends upwardly away from an outer surface of said perimeter wall; and
a securing member releasably securing a bottom side of said insert to a bottom wall of said trough; and
wherein said at least one cushioning member includes a plurality of said cushioning members, at least two of said cushioning members having a different depth with respect to each other.

2. The cushioning system according to claim 1, wherein said trough extends from a position adjacent to said first end to a position adjacent to said second end.

3. The cushioning system according to claim 2, wherein said trough is spaced from said break a distance greater than 0.25 inches.

4. The cushioning system according to claim 1, wherein said trough is bounded by a peripheral edge, said peripheral edge including a first edge positioned adjacent to said first end, a second edge positioned adjacent to said second end, a forward edge and a rearward edge each extending between said first and second edges, said forward and rearward edges being spaced from each other a distance equal to at least 0.75 inches.

5. The cushioning system according to claim 4, wherein said insert has a size and shape corresponding to said trough such that said insert entirely fills said trough.

6. The cushioning system according to claim 5, wherein said insert has a greater depth than a depth of said trough such that said insert extends upwardly away from an outer surface of said perimeter wall.

7. The cushioning system according to claim 1, wherein said insert has a size and shape corresponding to said trough such that said insert entirely fills said trough.

8. The cushioning system according to claim 7, wherein said insert has a greater depth than a depth of said trough such that said insert extends upwardly away from an outer surface of said perimeter wall.

9. The cushioning system according to claim 1, wherein said securing member comprises an adhesive.

10. The cushioning system according to claim 1, wherein at least two of said cushioning members comprises a different material with respect to each other.

11. A cushioning system for a positioning on bicycle handlebars, said system comprising:
a mount being contoured such that said mount is configured to be complementary in shape to a set of bicycle handlebars, said mount having a perimeter wall, said perimeter wall having a first end and a second end and being elongated from said first end to said second end, said perimeter wall having an elongated break therein extending between and through said first and second ends, wherein said break is configured to receive the handlebars, said mount being resiliently bendable such that said mount snaps onto and is configured to frictionally engage the bicycle handlebars;
said perimeter wall having an outer surface having an elongated trough therein;
at least one cushioning member comprising:
an insert being removably positioning in said trough, said insert comprising a resiliently compressible material, wherein said insert has a greater depth than a depth of said trough such that said insert extends upwardly away from an outer surface of said perimeter wall; and
a securing member releasably securing a bottom side of said insert to a bottom wall of said trough; and
wherein said at least one cushioning member includes a plurality of said cushioning members, at least two of said cushioning members comprises a different material with respect to each other.

12. A cushioning system for a positioning on bicycle handlebars, said system comprising:
a mount being contoured such that said mount is configured to be complementary in shape to a set of bicycle handlebars, said mount having a perimeter wall, said perimeter wall having a first end and a second end and being elongated from said first end to said second end, said perimeter wall having an elongated break therein extending between and through said first and second ends, a first free edge of said perimeter wall and a second free edge of said perimeter wall being defined on opposite sides of said break, wherein said break is configured to receive the handlebars, said mount being rigid such that said mount snaps onto and is configured to frictionally engage the bicycle handlebars, said perimeter wall having an upper portion and a lower portion positioned opposite of each other, said break being positioned in said lower portion, said mount being comprised of a resiliently bendable material;
said perimeter wall having an outer surface having an elongated trough therein, said trough extending from a position adjacent to said first end to a position adjacent to said second end, said trough being spaced from said break a distance greater than 0.25 inches, said trough being bounded by a peripheral edge, said peripheral edge including a first edge positioned adjacent to said first end, a second edge positioned adjacent to said second end, a forward edge and a rearward edge each extending between said first and second edges, said forward and rearward edges being spaced from each other a distance equal to at least 0.75 inches;
a plurality of cushioning members comprising:
an insert being removably positioning in said trough, said insert having a size and shape corresponding to said trough such that said insert entirely fills said trough, said insert having a greater depth than a depth of said trough such that said insert extends upwardly away from an outer surface of said perimeter wall, said insert comprising a resiliently compressible material;
a securing member releasably securing a bottom side of said insert to a bottom wall of said trough, said securing member comprising an adhesive;
at least two of said cushioning members having a different depth with respect to each other; and
at least two of said cushioning members comprising a different material with respect to each other.

* * * * *